Oct. 10, 1944.  W. E. LEIBING  2,359,925
FUEL CONTROL
Filed Dec. 3, 1942
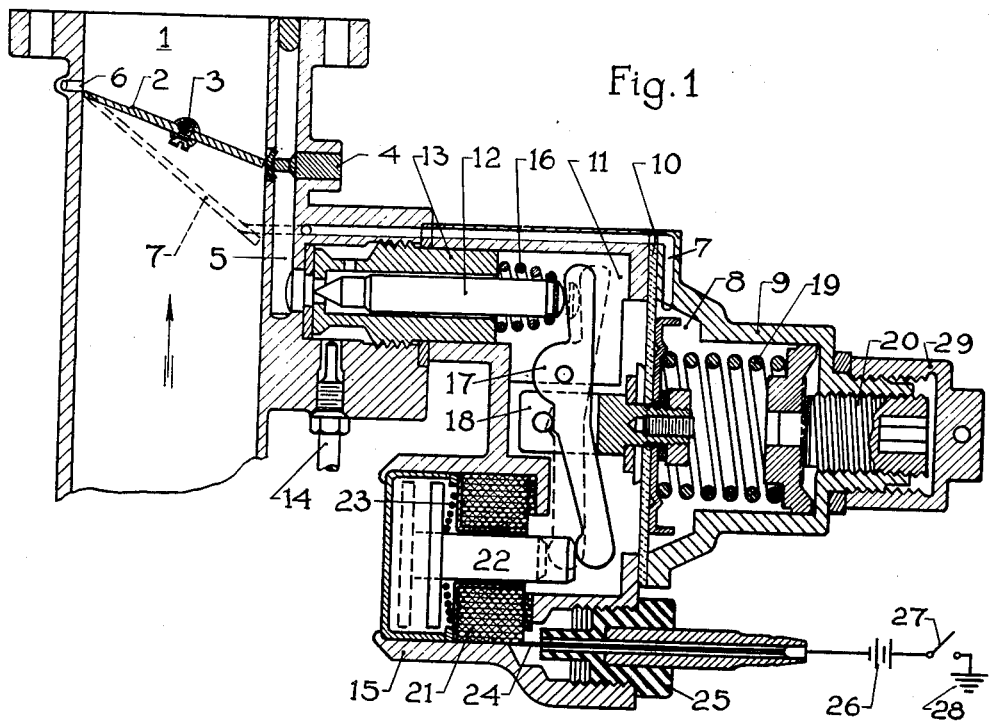
Fig. 1
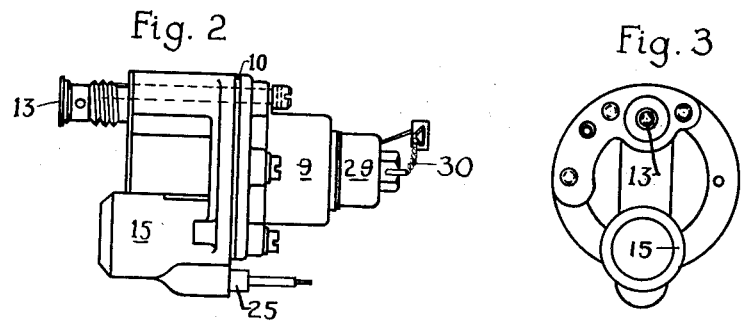
Fig. 2
Fig. 3
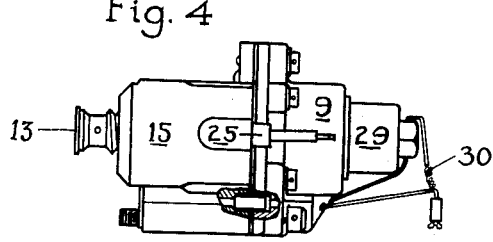
Fig. 4
INVENTOR
William E. Leibing
BY Arthur H. Robert
ATTORNEY Patented Oct. 10, 1944

2,359,925

UNITED STATES PATENT OFFICE 2,359,925

FUEL CONTROL

William E. Leibing, Detroit, Mich., assignor to Leibing-Fageol Company, Detroit, Mich., a partnership Application December 3, 1942, Serial No. 467,806

2 Claims. (Cl. 261—41)

On large internal combustion engines, such as are employed in aircraft and tanks, it has been found that, due to pre-ignition, the engine will continue to run after the ignition has been shut off. Because of this, aircraft and tank manufacturers have resorted to the use of a large solenoid operating, when energized through a manually controlled switch or push button, to close a fuel shut-off valve. The present invention relates to a solenoid arrangement of this general character.

The solenoid mechanisms heretofore proposed have been both expensive and troublesome. They are unable to withstand rough usage and to prevent the access of dust either to their working parts or to the fuel supply line.

The principal object of the present invention is to provide a novel solenoid arrangement for closing the fuel shut-off valve which arrangement is so simple in structure as to be relatively inexpensive to manufacture and so sturdy and compact as to be entirely unaffected by rough usage or dusty operating conditions.

Heretofore deceleration degassers have been proposed to eliminate the fuel waste occasioned by the carburetion, to internal combustion engines employed on automotive vehicles such as busses and trucks, of overrich mixtures when the vehicle is decelerating or driving the engine with the throttle closed, as when going downgrade. In one eminently satisfactory type of deceleration degasser, shown in my Patents Nos. 2,134,667 and 2,214,964 advantage is taken of the fact that, when the throttle is in the closed or idling position, the vacuum in the engine intake on the downstream side of the throttle valve is greater during deceleration than it is during idling. In this type, the idling or "closed throttle" fuel is shut off during deceleration by a pressure responsive device which operates, when the downstream vacuum rises into the decelerating range, to close the fuel shut-off valve.

I have discovered that a deceleration degasser of the type above noted and an idling shut-off solenoid mechanism may be inexpensively combined in a single unit to form a simple, compact, sturdy and inexpensive unit which is capable, first, of advantageous use on aircraft and tank engines for fuel saving, torch preventing and idling shut-off purposes and, second, of withstanding extremely rough usage and dusty operating conditions. The production of a combined unit of this character forms another important object of the invention.

An embodiment of the invention is illustrated in the accompanying drawing wherein:

Figure 1 is a section through a preferred embodiment of the invention showing its relation to a section of a carburetor fuel mixing conduit;

Figure 2 is a side elevation of the unit of Figure 1 with the carburetor conduit omitted;

Figure 3 is an elevation of the left end of the unit as it appears in Figure 2; and Figure 4 is a bottom plan of the unit as it appears in Figures 2 and 3.

A portion of an up-draft carburetor is conventionally illustrated in Figure 1. It comprises: a fuel mixing conduit 1; a throttle valve 2 mounted on a shaft 3; a conventional idling jet 4 connected to the fuel supply line terminal 5; and an opening 6 communicating with the conduit 1 at a position where it is subject to the downstream vacuum only when the throttle valve 2 is in the idling position.

The hole 6 communicates via hole 7 by means not completely shown with the chamber 8 formed within the outer or right hand housing 9 in a manner whereby chamber 8 is always subject to the pressures existing within hole 6.

The fuel supply line 5 intersects or passes through valve seat 13, past the fuel shut-off needle valve 12 and hence to carburetor float chamber fuel supply jet 14, in a manner whereby when shut-off needle valve 12 is against seat 13 all fuel is effectively shut off and further whereby when shut-off valve 12 is off its seat, there is no interference with the idling functions of the fuel supply line 14—13—5 to jet 4.

The deceleration degasser described and illustrated herein and also in my aforesaid patents, particularly 2,214,964, operates in response to decelerating vacuum pressures communicated through opening 6, to close shut-off valve 12 and thus shut off the flow of fuel from the supply line 14 to the terminal passage 5. While various forms of the degasser may be employed, a form of the character illustrated is preferred for engines subject to rough usage and dusty operating conditions since all operating parts are completely enclosed with a sealed flooded chamber 11 formed within housing 15 and separated from the vacuum chamber 8 by a "Duprene" or other flexible material impermeable to gasoline diaphragm 10. The sealed flooded chamber 11 has communication, through the clearance along shut-off valve 12 with the valved passage between supply and terminal passage 5 and 14 respectively; hence it is always flooded with fuel.

Inasmuch as a detailed understanding of the structure and operation of the essential elements of the degasser may be obtained by reference to the aforesaid patents, it should suffice here to explain the illustrated structure in terms of its operation.

In normal idling operation the throttle valve 2 assumes the position shown in Figure 1 while the shut-off valve 12 is urged by the spring 16 to the full open position in which it presses against the front end section of the walking beam 17 holding that member in the dotted line position shown in Figure 1 with its rear end section in position for operative engagement by a yoke member 18 suitably secured to the diaphragm 10. In this manner fuel is permitted to pass from the supply line 14 successively through the shut-off valve seat passage, the terminal passage 5 and the idling jet 4 into conduit 1. At the same time the downstream idling vacuum, at opening 6, is communicated to the vacuum chamber 8 tending to flex the diaphragm 10 into the vacuum chamber 8. This flexure is resiliently opposed by a spring 19 which is interposed between diaphragm 10 and an adjusting screw 20 which may be turned to adjust the compression on the spring.

When the engine decelerates, with the throttle valve 2 in the idling position, the downstream vacuum rises from the idling range to the decelerating range. This increased vacuum is communicated to vacuum chamber 8 causing the diaphragm 10 to flex inwardly against spring 19 thereby correspondingly moving yoke member 18 to rotate the walking beam 17 counter-clockwise against valve 12, thus moving the shut-off valve 12 to the fully closed position. In this manner the idling fuel supply is shut-off during deceleration. Of course, when the idling speed is resumed and the idling downstream vacuum re-established, the spring 19 will restore diaphragm 10, yoke 18 and beam 17 to their idling positions permitting spring 16 to re-open the shut-off valve 12 and thus restore the idling fuel supply.

Heretofore considerable thought has been given to the problem of shutting off the idling fuel of aircraft and tank engines when the ignition was shut-off in order to prevent the engine from continuing to run as a result of pre-ignition. Considerable attention has also been given to the solenoid arrangements heretofore employed to shut-off the idling fuel since they were not only cumbersome and expensive, but more importantly, a constant source of trouble. After considering this problem at length, I conceived that it might be completely and inexpensively solved and a more advantageous unit provided by sealing a small solenoid within the housing of my degasser and arranging it to operate the shut-off valve 12 independently, and without otherwise interfering with the normal operation, of my degasser. With this conception, it becomes obvious that the solenoid may be incorporated, at various positions within the housing 15 to accomplish the stated purpose. For example, it could be positioned to encircle the valve 12 so as to move that valve magnetically to the closed position against the action of spring 16 when the solenoid is energized. Only one of these suggested arrangements is illustrated since the changes necessary to utilize the other arrangements will be obvious to those skilled in the art.

In accordance with my invention, therefore, the flooded chamber 11 is enlarged to receive a solenoid 21 having an outer covering or casing that is impermeable to the fuel. The solenoid contains a plunger 22 which is normally held in an extended position by a conical spring 23. In the extended position, the solenoid plunger 22 remains out of the working range of the rear section of the walking beam 17 to avoid interference with the normal operation of the degasser, said extended position being illustrated in Figure 1 by the dotted outlines. When the solenoid is energized the plunger is retracted into the solenoid against the action of spring 23, and, in moving to the retracted position, it engages an extended end of the walking beam 17 thereby rotating it counter-clockwise to effect the closure of valve 12. One end of the coil of the solenoid 21 is suitably grounded while the other end 24, which extends out of the housing 15 through a suitably sealed connection including an insulating screw plug 25, is connected through battery 26 to a normally open switch 27 leading to ground 28. The switch 27 may, of course, be mounted on the dashboard of the vehicle.

It will of course be understood that the housing sections are securely bolted not only to each other over the periphery of the diaphragm 10 but also to the framework into which the valve seat 13 extends so as to maintain fluid tight joints. A cap 29 is screwed to housing 9 not only to protect the adjusting screw 20, but to seal that end of the housing. If desired, the cap 29 may be provided with a suitably arranged sealing wire 30 to insure against unauthorized tampering.

It will be appreciated that the foregoing combination of degasser and solenoid-operated shut-off provides a simple, compact and sturdy unit which may be inexpensively manufactured, quickly assembled, or disassembled, and roughly used. Since all parts are completely sealed, they are effectively protected against the access of dust. It advantageously combines fuel saving and idle fuel shut-off mechanisms so that only one shut-off valve is necessary. The application of a degasser to dive bomber engines, which require idle fuel shut-off valves, is particularly advantageous since it prevents torching, i. e., the burning of fuel at the exhaust, during dive bombing operations.

Having described my invention I claim:

1. A device for controlling the flow of idling fuel into a carburetor fuel mixing conduit having a throttle valve on the downstream side of which the vacuum is apt to rise from its normal operating range into the decelerating range during various operating intervals comprising: a fuel shut-off valve; means normally maintaining said valve open when the downstream vacuum is in the normal range; a housing having an operating chamber which communicates with said valve and which is flooded with fuel through such communication to seal the chamber against the access of dust; a walking beam arranged in said operating chamber to close and release the valve when actuated in one direction and the other; means in said operating chamber responsive to the downstream vacuum for actuating said walking beam in the valve closing direction when the vacuum rises into the decelerating range; and manually controlled electrically energizable means in the housing arranged when energized to actuate the walking beam also in the valve closing direction but independently of said responsive means, said manually controlled means including a solenoid and plunger positioned in said operating chamber with the plunger arranged to actuate the walking beam when the solenoid is energized.

2. A device for controlling the flow of idling fuel into a carburetor fuel mixing conduit having a throttle valve on the downstream side of which the vacuum is apt to rise from its normal operating range into the decelerating range during various operating intervals comprising: an idling-fuel control valve; means normally maintaining said valve open when the downstream vacuum is below the decelerating range; a housing divided by a diaphragm into operating and vacuum chambers, the operating chamber having communication with said valve and the diaphragm being subjected through the vacuum chamber to variations in the downstream vacuum and arranged to move in response to such variations between positions corresponding to normal vacuum and decelerating vacuum; a walking beam, having front and rear sections, pivotally mounted in the operating chamber with its front section in position to close and release the valve when the beam is swung in one direction and the other; means connecting the diaphragm to the walking beam to actuate the beam in the valve closing direction when the diaphragm moves toward its decelerating vacuum position; and a solenoid and plunger unit mounted in the operating chamber with the solenoid normally deenergized and the plunger normally positioned out of engagement with the rear section of the walking beam, the plunger being arranged, when the solenoid is energized, to move into engagement with said rear section and thereby actuate the walking beam independently of the diaphragm but sufficiently to close the valve.

WILLIAM E. LEIBING.